United States Patent
Jiang

(10) Patent No.: US 8,107,447 B2
(45) Date of Patent: *Jan. 31, 2012

(54) METHOD AND APPARATUS FOR HANDLING CONTROL PDUS DURING RE-ESTABLISHMENT OF TRANSMITTING SIDES IN WIRELESS COMMUNICATIONS SYSTEMS

(75) Inventor: Sam Shiaw-Shiang Jiang, Taipei (TW)

(73) Assignee: Innovative Sonic Limited, Port Louis (MU)

( * ) Notice: Subject to any disclaimer, the term of this patent is extended or adjusted under 35 U.S.C. 154(b) by 383 days.

This patent is subject to a terminal disclaimer.

(21) Appl. No.: 11/524,487

(22) Filed: Sep. 21, 2006

(65) Prior Publication Data

US 2007/0064601 A1    Mar. 22, 2007

Related U.S. Application Data

(60) Provisional application No. 60/596,402, filed on Sep. 21, 2005.

(51) Int. Cl.
*H04W 4/00* (2009.01)

(52) U.S. Cl. .......... 370/338; 455/500; 455/69; 370/278; 370/394

(58) Field of Classification Search .................. 375/293; 370/354, 328, 229, 468, 469, 503, 507, 278, 370/500; 455/502, 517, 436, 469, 500, 69

See application file for complete search history.

(56) References Cited

U.S. PATENT DOCUMENTS

| | | |
|---|---|---|
| 6,697,331 B1 | 2/2004 | Riihinen |
| 6,763,491 B2 | 7/2004 | McDonnell |
| 6,842,445 B2 | 1/2005 | Ahmavaara |
| 6,922,393 B2 | 7/2005 | Jiang et al. |
| 6,947,394 B1 | 9/2005 | Johansson |
| 6,987,981 B2 * | 1/2006 | Kuo ............... 455/502 |
| 7,054,270 B2 | 5/2006 | Yi |
| 7,171,224 B2 * | 1/2007 | Sarkkinen et al. ........... 455/502 |
| 7,325,172 B2 * | 1/2008 | Jang ............... 714/700 |
| 7,411,979 B2 * | 8/2008 | Jiang ............... 370/469 |
| 2002/0009005 A1 | 1/2002 | Kahlman et al. |
| 2003/0016698 A1 | 1/2003 | Chang et al. |

(Continued)

FOREIGN PATENT DOCUMENTS

CN     1476182     2/2004

(Continued)

OTHER PUBLICATIONS

Xu et al., Proceedings of the 2002 Winter Simulation Conference, "Simulation Analysis of RLC Timers in UMTS Systems", pp. 506-512, (2002).

(Continued)

*Primary Examiner* — Kamran Afshar
*Assistant Examiner* — Khalid Shaheed
(74) *Attorney, Agent, or Firm* — Klein, O'Neill & Singh, LLP

(57) ABSTRACT

A wireless communications system has a communications device, which has an RLC entity having a transmitting side and a receiving side. When re-establishing the transmitting side, to handle control PDUs, only the transmitting side in the RLC entity of the communications device is re-established, a first control PDU corresponding to the transmitting side is discarded, and a second control PDU corresponding to the receiving side is retained and not discarded.

16 Claims, 3 Drawing Sheets

U.S. PATENT DOCUMENTS

| | | | |
|---|---|---|---|
| 2003/0206534 A1* | 11/2003 | Wu | 370/328 |
| 2004/0032851 A1 | 2/2004 | Wu | |
| 2004/0037327 A1 | 2/2004 | Torsner | |
| 2004/0047331 A1 | 3/2004 | Jang | |
| 2004/0076182 A1 | 4/2004 | Wu | |
| 2004/0148546 A1 | 7/2004 | Meyer | |
| 2004/0153896 A1 | 8/2004 | Jang | |
| 2004/0184437 A1* | 9/2004 | Lee et al. | 370/349 |
| 2004/0203623 A1 | 10/2004 | Wu | |
| 2004/0252719 A1* | 12/2004 | Jami et al. | 370/470 |
| 2005/0287957 A1* | 12/2005 | Lee et al. | 455/68 |
| 2006/0056441 A1 | 3/2006 | Jiang | |
| 2006/0098574 A1* | 5/2006 | Yi et al. | 370/236 |
| 2006/0154603 A1* | 7/2006 | Sachs et al. | 455/39 |
| 2006/0281413 A1 | 12/2006 | Burbidge | |

FOREIGN PATENT DOCUMENTS

| | | |
|---|---|---|
| EP | 1 389 886 A1 | 2/2004 |
| EP | 1 424 823 A1 | 6/2004 |
| JP | 2001-285350 | 10/2001 |
| JP | 2003-111147 | 4/2003 |
| JP | 2003-224618 A | 8/2003 |
| JP | 2004179917 | 6/2004 |
| JP | 2004364277 | 12/2004 |
| JP | 2005073250 | 3/2005 |
| JP | 2006522560 | 9/2006 |
| KR | 2003-0005064 A | 1/2003 |
| KR | 10-2004-0015672 A | 2/2004 |
| KR | 10-2004-0034398 A | 4/2004 |
| KR | 2007037979 A * | 4/2007 |
| TW | 496058 | 7/2002 |
| TW | 577204 | 2/2004 |
| TW | 588513 | 5/2004 |
| TW | I223520 | 11/2004 |
| WO | 2004091130 A1 | 10/2004 |

OTHER PUBLICATIONS

3GPP TS 25.322 V6.4.0 (Jun. 2005), "Radio Link Control (RLC) Protocol Specification (Release 6)".

R2-052168 "Single Sided RLC Re-establishment", Motorola, 3GPP RAN2 #48 meeting, Aug. 2005.

3GPP TS 25.322 V5.11.0, Radio Link Control (RLC) protocol specification (Release 5), Jun. 2005, P52-P53.

* cited by examiner

METHOD AND APPARATUS FOR HANDLING CONTROL PDUS DURING RE-ESTABLISHMENT OF TRANSMITTING SIDES IN WIRELESS COMMUNICATIONS SYSTEMS

CROSS REFERENCE TO RELATED APPLICATIONS

This application claims the benefit of U.S. Provisional Application No. 60/596,402, filed on Sep. 21, 2005 and entitled "Improved Single-Sided Re-establishment Method and Apparatus in a wireless communications system," the contents of which are incorporated herein by reference.

BACKGROUND OF THE INVENTION

1. Field of the Invention

The present invention relates to methods and related communications devices utilized in re-establishing a transmitting side of communications devices in a wireless communications system, and more particularly, to a method and related apparatus for handling control PDUs when only the transmitting side of an RLC entity is re-established.

2. Description of the Prior Art

The third generation (3G) mobile communications system has adopted a Wideband Code Division Multiple Access (WCDMA) wireless air interface access method for a cellular network. WCDMA can provide high frequency spectrum utilization, universal coverage, and high quality, high speed multimedia data transmission. The WCDMA method also meets all kinds of QoS requirements simultaneously, providing diverse flexible two-way transmission services and better communication quality to reduce transmission interruption rates.

Taking a signal communications protocol standard set forth by the 3rd Generation Partnership Project (3GPP) as an example, targeting the Access Stratum (AS), the 3G mobile communications system defines various protocol stacks, such as Radio Resource Control (RRC), Radio Link Control (RLC), Media Access Control (MAC), Packet Data Convergence Protocol (PDCP), and Broadcast/Multicast Control (BMC). In addition, the 3G mobile communications system also provides different levels of transmission quality, and can operate in different corresponding modes according to different transmission quality requirements, such as: Transparent Mode (TM), Unacknowledged Mode (UM), and Acknowledged Mode (AM). TM is appropriate for use in services with high requirements for real-time transmission, UM is appropriate for use in services with requirements for real-time transmission and packet sequencing, and AM is appropriate for use in services with low requirements for real-time transmission, but high requirements for data accuracy.

In AM, the RLC layer combines a transmitting side and a receiving side. The transmitting side and the receiving side each process transmission and reception through the RLC layer, and both sides can share system resources. In some circumstances, the RLC layer must be reestablished, e.g. when reconfiguring the size of PDUs. The prior art reestablishes the RLC layer by reestablishing the transmitting side or the receiving side.

Directed at operations corresponding to reestablishing the RLC layer, a communications protocol specification established by the 3GPP (3GPP TS 25.322 V6.4.0 (2005-06), "Radio Link Control (RLC) protocol specification (Release 6)") and a Change Request (R2-052168 "Single Sided RLC Re-establishment", Motorola, 3GPP RAN2 #48 meeting, August 2005) are already described in detail. The details of the communications protocol specification and the Change Request can be summarized as follows: When reestablishment of a transmitting side and/or a receiving side of an AM RLC entity is initiated by a upper layer, the RLC entity should execute the following two operations:

1. If the receiving side (downlink of a mobile phone or uplink of a networking device) of the RLC entity is being reestablished, reset protocol status variables (VR(R), VR(H), and VR(MR)) corresponding to the receiving side; set configurable protocol parameters (Configured_Tx_Window_Size and Configured_Rx_Window_Size) corresponding to the receiver to accurate values; set a Hyper Frame Number of the receiving side to a value set by the upper layer; and discard all control PDUs of the receiving side and the transmitting side, and discard data PDUs of the receiving side. If only the receiving side is being reestablished, the prior arts described above have not yet disclosed a method of handling a timer.

2. If the transmitting side (uplink of the mobile phone or downlink of the networking device) of the RLC entity is being reestablished, reset protocol status variables (VT(S), VT(A), VT(DAT), VT(MS), VT(PDU), VT(SDU), VT(RST), VT(MRW), and VT(WS)) corresponding to the transmitting side; set configurable protocol parameters (MaxDat, Poll_PDU, Poll_SDU, Poll_Window, MaxRST, MaxMRW, OSD_Window_Size, and DAR_Window_Size) corresponding to the transmitter to accurate values; set a Hyper Frame Number of the transmitting side to a value set by the upper layer. In this operation, if only the transmitting side of the RLC entity is being reestablished, discard all control PDUs of both the receiving side and the transmitting side, and discard all already successfully transmitted SDUs of the transmitting end. Segment any not yet discarded SDUs into PDUs again based on a configured size of the PDU. If the transmitting side and the receiving side of the RLC entity are both being reestablished, discard the control PDUs of the receiving side and the transmitting side, and discard the data PDUs of the receiving side. If the transmitting side is being reestablished, regardless of whether or not the receiving side is being reestablished, stop all timers except for Timer_Poll_Periodic, Timer_Status_Periodic, and Timer_Discard, which corresponds to the SDUs that have not yet been discarded. Finally, if needed, inform the upper layer of the SDUs that have already been discarded.

As described above, when only re-establishing the transmitting side, the prior art discards all of the control PDUs of the receiving side and the transmitting side, which could lead to a system error. For example, if the receiving side sends a STATUS PDU before the transmitting side is re-established, after the transmitting side has been re-established, the prior art will discard the STATUS PDU, such that the STATUS PDU cannot be transmitted successfully, and a delay occurs in transmission of data from the receiving side. Likewise, if the receiving side sends an SDU DELETE ACK PDU, i.e. an MRW ACK SUFI PDU, and a RESET ACK PDU before only the transmitting side has been re-established, after only the transmitting side has been re-established, the prior art will discard both the MRW ACK SUFI PDU and the RESET ACK PDU, such that following processes are unable to execute correctly.

SUMMARY OF THE INVENTION

According to the present invention, a method of handling control PDUs in a wireless communications system having a communications device having an RLC entity having a transmitting side and a receiving side when reestablishing the transmitting side comprises only reestablishing the transmitting side in the RLC entity of the communications device, discarding a first control PDU corresponding to the transmitting side, and retaining and not discarding a second control PDU corresponding to the receiving side.

According to the present invention, a communications device utilized in a wireless communications system, an RLC entity of the communications device having a transmitting side and a receiving side, utilized for accurately reestablishing the transmitting side, the communications device comprises a control circuit for realizing functions of the communications device, a central processing unit for executing a program code to operate the control circuit, and a memory for storing the program code. The program code comprises only reestablishing the transmitting side in the RLC entity of the communications device, discarding a first control PDU corresponding to the transmitting side, and retaining and not discarding a second control PDU corresponding to the receiving side.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
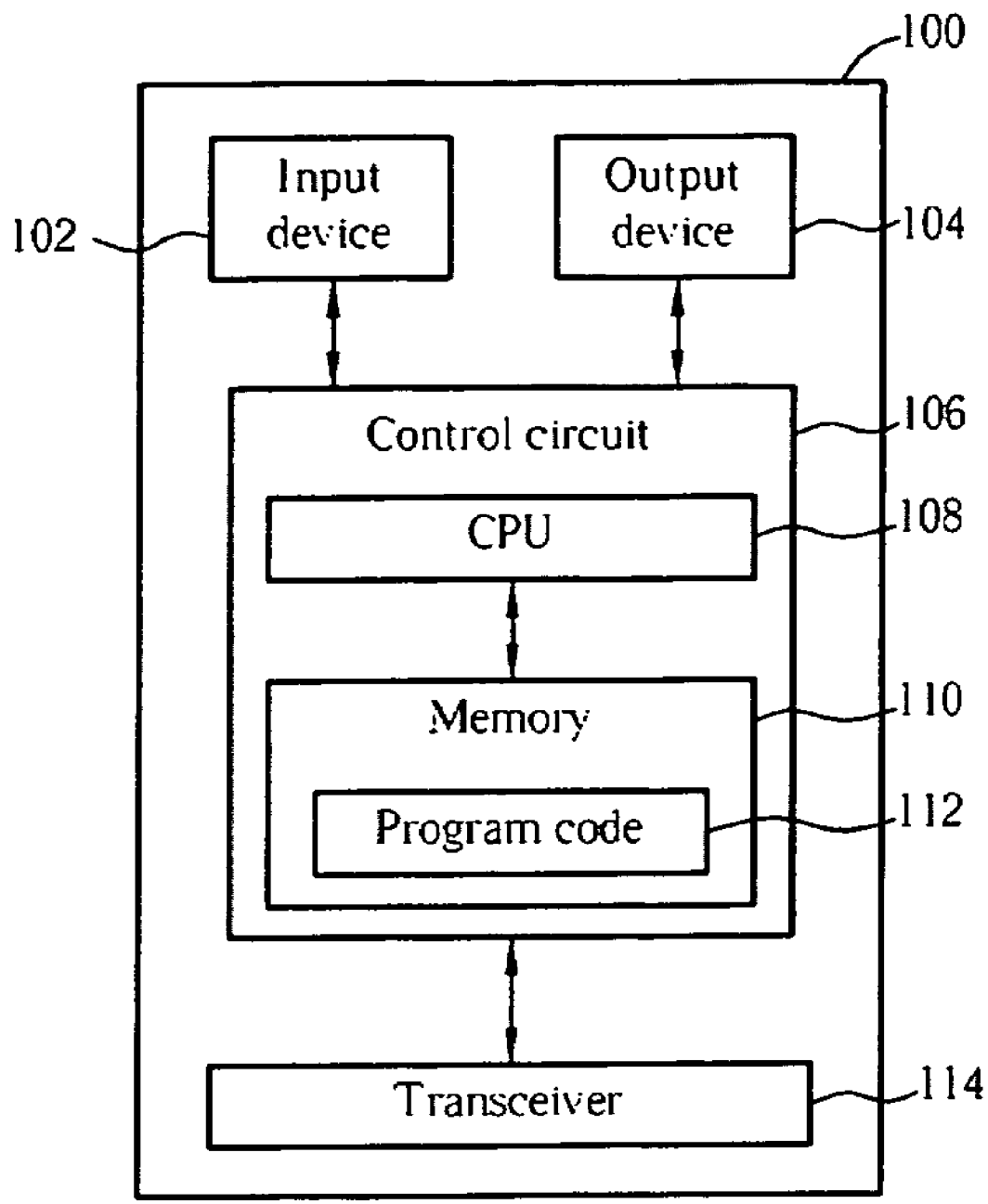
FIG. 1 is a functional block diagram of a communications device according to the present invention.

In the communications protocol specification (3GPP TS 25.322 V6.4.0 (2005-06), "Radio Link Control (RLC) protocol specification (Release 6)") established by the 3GPP, parameters, variables, timers, and control PDUs, etc. are defined according to different operating requirements. Based on the above-mentioned communications protocol specification, the parameters, variables, and timers can be defined as corresponding to the transmitting side or the receiving side of the RLC layer. Taking protocol status variables for AM as an example, protocol status variables corresponding to status of the receiving side comprise VR(R), VR(H), and VR(MR). Protocol status variables corresponding to status of the transmitting side comprise VT(S), VT(A), VT(DAT), VT(MS), VT(PDU), VT(SDU), VT(RST), VT(MRW), and VT(WS). Timers corresponding to the receiving side comprise Timer_Status_Periodic and Timer_Status_Prohibit. Timers corresponding to the transmitting side comprise Timer_Poll, Timer_Poll_Periodic, Timer_Poll_Prohibit, Timer_Discard, Timer_RST, and Timer_MRT. Protocol parameters corresponding to the receiving side comprise Configured_Tx_Window_Size and Configured_Rx_Window_Size. Protocol parameters corresponding to the transmitting side comprise MaxDAT, Poll_PDU, Poll_SDU, Poll_Window, MaxRST, MaxMRW, OSD_Window_Size, and DAR_Window_Size. Definitions for the above-mentioned protocol status variables, timers, and protocol variables can be found in the communications protocol specification, and are not repeated here.

However, regarding control PDUs, the above-mentioned communications protocol specification does not clearly define which control PDUs correspond to the receiving side of the RLC layer, and which control PDUs correspond to the transmitting side of the RLC layer. In order to clearly describe the spirit of the present invention, the following is a definition of which side each control PDU corresponds to. First, the above-mentioned communications protocol specification separates the control PDUs into three broad categories: 1) STATUS PDUs and Piggybacked STATUS PDUs, 2) RESET PDUs, and 3) RESET ACK PDUs. The first type of control PDU is primarily comprised of a header (for indicating the type of PDU), one or a plurality of super fields (SUFI), and a PAD. By setting information carried by the SUFIs, the STATUS PDU and the Piggybacked STATUS PDU can become one of the following types:

1. ACK/NACK: A receiving status report which the receiver reports back to the transmitter regarding information about received or lost PDUs.
2. Change Window Size: Information transmitted to the transmitter by the receiver requesting the transmitter change the size of the transmission window.
3. MRW: A request by the transmitter of the receiver to advance a position of the receiving window of the receiver.
4. MRW ACK: Report sent by the receiver to the transmitter to acknowledge that the receiver has already received a STATUS PDU comprising an MRW.

On the other hand, the RESET PDU is transmitted to the receiver from the transmitter, and used to achieve synchronization by resetting all of the protocol parameters, status variables, and some of timers. Analogously, the RESET ACK PDU is a report sent by the receiver to the transmitter to acknowledge receipt of the RESET PDU.

The ACK/NACK, Change Window Size, and MRW ACK STATUS PDUs and the RESET ACK PDU all correspond to the receiving side of the RLC layer. The MRW STATUS PDU and the RESET PDU correspond to the transmitting side of the RLC layer.

Having clearly defined which control PDUs correspond to which side of the RLC layer, we can now move on to describe the embodiments of the present invention.

The present invention relates to a wireless communication system operating in Acknowledged Mode, and is utilized to re-establish the transmitting side accurately, so as to improve wireless transmission efficiency and prevent system errors. The wireless communications system is preferably a 3G mobile communications system.

Please refer to FIG. 1, which is a functional block diagram of a communications device 100. For the sake of brevity, FIG. 1 only shows an input device 102, an output device 104, a control circuit 106, a central processing unit (CPU) 108, a memory 110, a program code 112, and a transceiver 114 of the communications device 100. In the communications device 100, the control circuit 106 executes the program code 112 in the memory 110 through the CPU 108, thereby controlling an operation of the communications device 100. The communications device 100 can receive signals input by a user through the input device 102, such as a keyboard, and can output images and sounds through the output device 104, such as a monitor or speakers. The transceiver 114 is used to receive and transmit wireless signals, delivering received signals to the control circuit 106, and outputting signals generated by the control circuit 106 wirelessly. From a perspective of a communications protocol framework, the transceiver 114 can be seen as a portion of Layer 1, and the control circuit 106 can be utilized to realize functions of Layer 2 and Layer 3.

Figure 2:
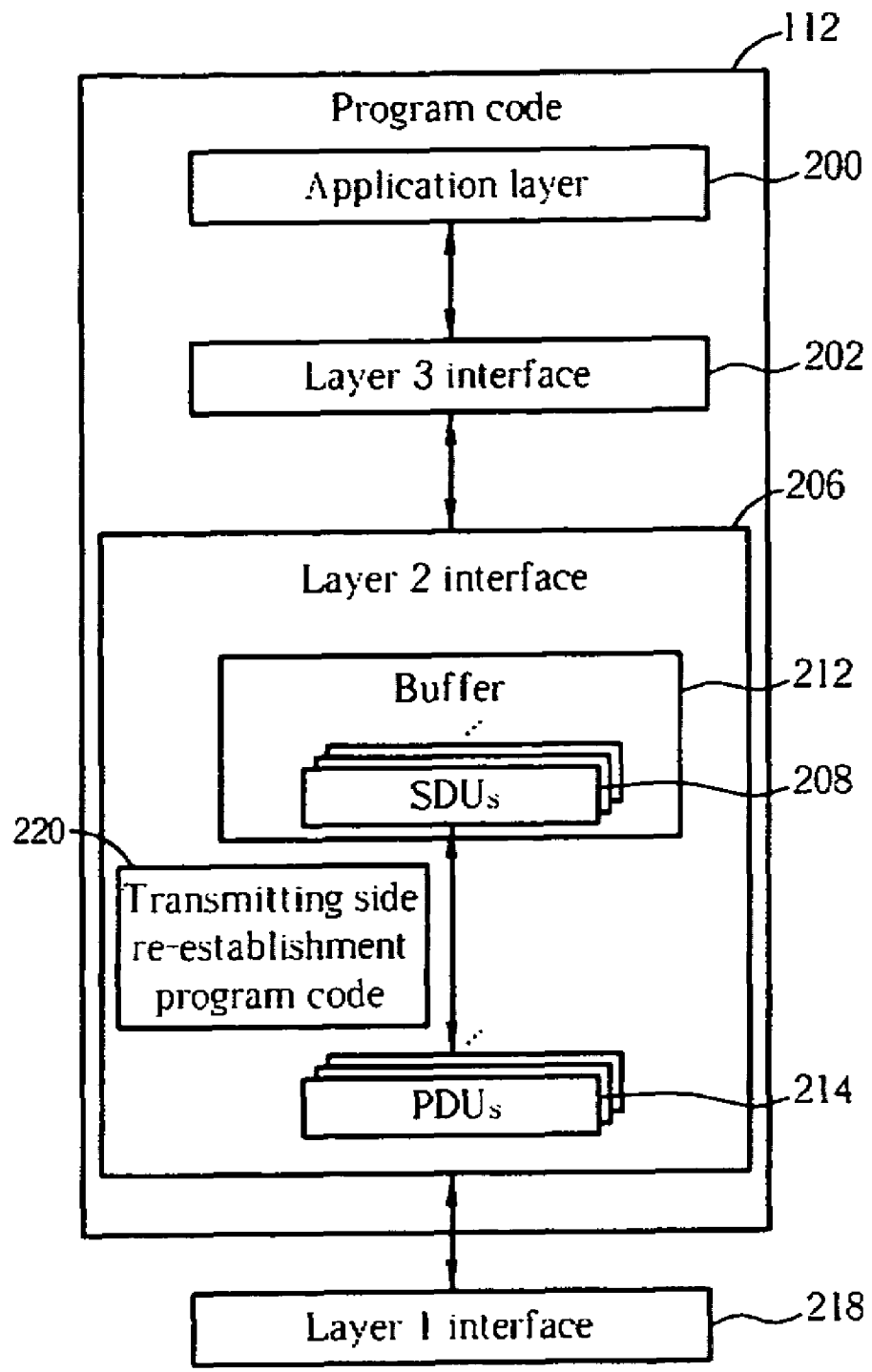
FIG. 2 is a diagram of program code of FIG. 1.

Please continue to refer to FIG. 2. FIG. 2 is a diagram of the program code 112 shown in FIG. 1. The program code 112 comprises an application layer 200, a Layer 3 interface 202, and a Layer 2 interface 206, and is coupled to a Layer 1 interface 218. When a signal is transmitted, the Layer 2 interface 206 forms a plurality of SDUs 208 according to data submitted by the Layer 3 interface 202, and stores the plurality of SDUs 208 in a buffer 212. Then, based on the SDUs 208 stored in the buffer 212, the Layer 2 interface 206 generates a plurality of PDUs 214, and sends the plurality of PDUs 214 to a destination terminal through the Layer 1 interface 218. In contrast, when a wireless signal is received, the signal is received through the Layer 1 interface 218, then delivered as PDUs 214 to the Layer 2 interface 206. The Layer 2 interface 206 restores the PDUs 214 to SDUs 208 and stores the SDUs 208 in the buffer 212. Last, the Layer 2 interface 206 delivers the SDUs 208 stored in the buffer 212 to the Layer 3 interface 202.

When the communications device 100 operates in AM, the Layer 2 interface 206 is a combination of the transmitting side and the receiving side. The transmitting side and the receiving side respectively represent the transmitting and receiving portions of the RLC layer. In some circumstances, the transmitting side of the Layer 2 interface 206 must be re-established. The present invention can re-establish the transmitting side of the Layer 2 interface 206 based on transmitting side re-establishment program code 220.

Figure 3:
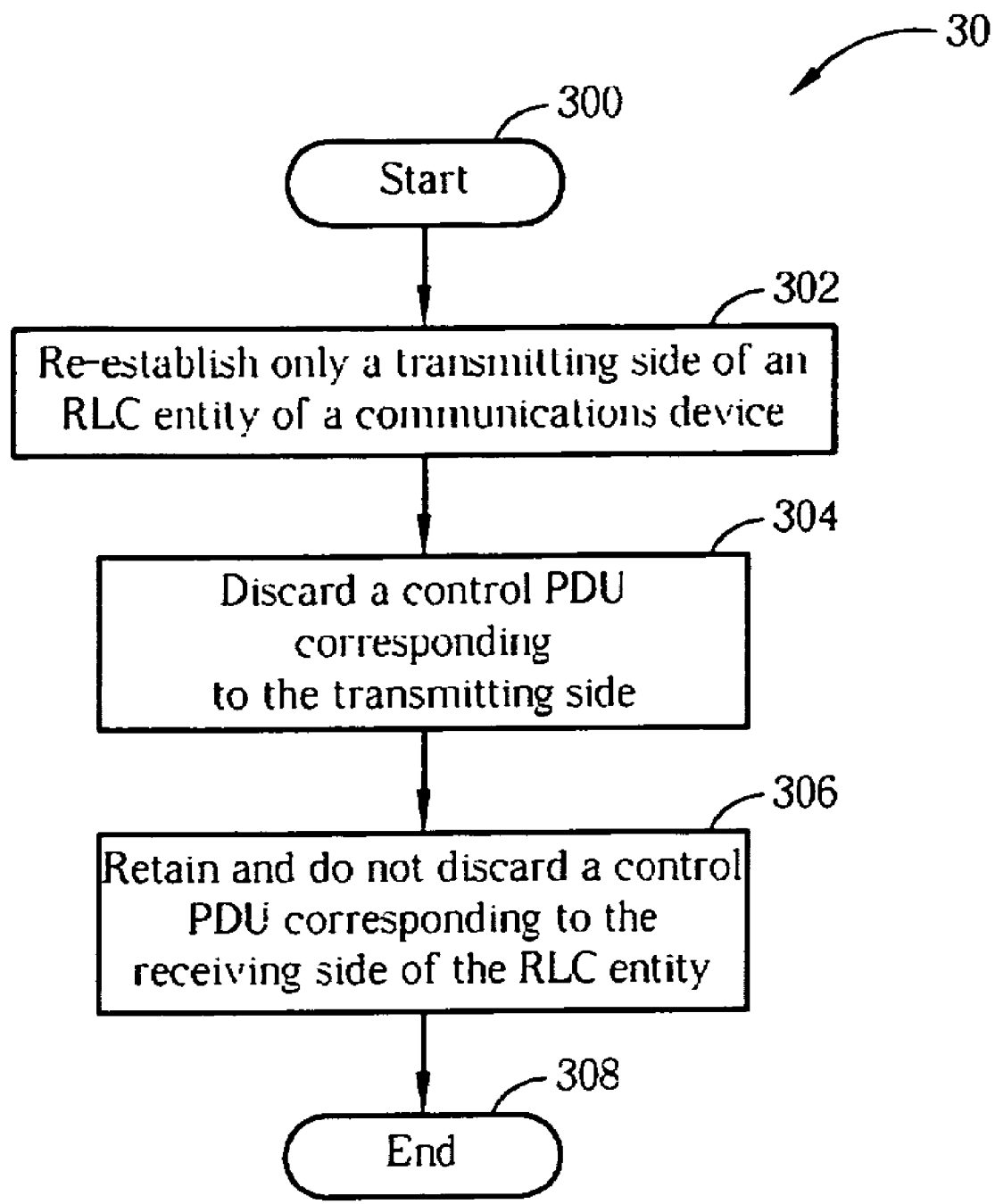
FIG. 3 is a flow chart diagram of a process according to the present invention.

Please refer to FIG. 3, which is a diagram of a process 30 according to the present invention. The process 30 is utilized to re-establish the transmitting side of the wireless communications system, and can be seen as the transmitting side re-establishment program code 220. The process 30 comprises steps of:

Step 300: Start.

Step 302: Re-establishing only a transmitting side of an RLC entity of a communications device.

Step 304: Discarding a control PDU corresponding to the transmitting side.

Step 306: Retaining and not discarding a control PDU corresponding to the receiving side of the RLC entity.

Step 308: End.

According to the process 30, when the RLC entity only re-establishes the transmitting side, the present invention discards the control PDU corresponding to the transmitting side, and retains and does not discard a control PDU corresponding to the receiving side. As mentioned previously, the control PDUs corresponding to the transmitting side comprise the MRW STATUS PDU and the RESET PDU, of which at least one is discarded in Step 304. On the other hand, the process 30 does not discard a control PDU corresponding to the receiving side, such as the ACK/NACK, Change Window Size, MRW ACK STATUS PDU, and RESET ACK PDU, of which at least one will be retained, and not discarded, in Step 306.

Thus, when the RLC entity only re-establishes the transmitting side, the preferred embodiment of the present invention discards the control PDU (at least one of the MRW STATUS PDU and the RESET PDU) corresponding to the transmitting side, and does not discard at lease one control PDU corresponding to the receiving side. In this way, accurate execution of related procedures can be maintained. For example, according to the process 30, the RLC entity discards the MRW STATUS PDU and the RESET PDU when only re-establishing the transmitting side, e.g. a mobile phone uplink or a networking device downlink, but does not discard at least one of the ACK/NACK control PDU, the Change Window Size control PDU, the MRW ACK STATUS PDU and the RESET ACK PDU. In this way, after the transmitting side has been re-established, the receiving side of the RLC entity can accurately and timely transmits a reception status of the PDUs and the STATUS PDU with WINDOW SUFI if needed. Further, if the transmitting side has not responded with a MRW ACK STATUS PDU to a received MRW STATUS PDU or with a RESET ACK PDU to a received RESET PDU before the transmitting side has been re-established, the transmitting side can respond the MRW ACK STATUS PDU or the RESET ACK PDU after re-establishment is completed.

Simply speaking, by utilizing the process 30, when the RLC entity is only re-establishing the transmitting side, the control PDU corresponding to the transmitting side can be discarded, and the control PDU corresponding to the receiving side can be kept to improve system efficiency. Thus, the method of handling the control PDUs during re-establishment of only the transmitting side of the RLC layer provided by the present invention not only improves efficiency of use of wireless resources, but also helps related processes execute correctly. Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling control PDUs in a wireless communications system having a communications device having an Radio Link Controller (RLC) entity having a transmitting side and a receiving side when reestablishing the transmitting side comprising:
   only reestablishing the transmitting side in the Radio Link Controller (RLC) entity of the communications device;
   discarding a first control Packet Data Unit (PDU) corresponding to the transmitting side:
   retaining and not discarding a second control Packet Data Unit (PDU) corresponding to the receiving side: and
   wherein the first control Packet Data Unit (PDU) corresponding to the transmitting side is a move receiving window (MRW) STATUS PDU.

2. A communications device utilized in a wireless communications system, an Radio Link Controller (RLC) entity of the communications system having a transmitting side and a receiving side, utilized for accurately reestablishing the transmitting side, the wireless communications device comprising:
   a control circuit for realizing functions of the wireless communications device: a central processing unit for executing a program code to operate the control circuit; and
   a memory for storing the program code;
   wherein the program code comprises:
   only reestablishing the transmitting side in the Radio Link Controller (RLC) entity of the communications device:
   discarding a first control Packet Data Unit (PDU) corresponding to the transmitting side: and
   retaining and not discarding a second control Packet Data Unit (PDU) corresponding to the receiving side; and
   wherein the first control Packet Data Unit (PDU) corresponding to the transmitting side is a move receiving window (MRW) STATUS PDU.

3. The method of claim 1, wherein the first control PDU corresponding to the transmitting side is a RESET PDU.

4. The method of claim 1, wherein the second control PDU corresponding to the receiving side is an acknowledged negatively acknowledged (ACK/NACK) STATUS PDU.

5. The method of claim 1, wherein the second control PDL corresponding to the receiving side is a change window size STATUS PDU.

6. The method of claim 1, wherein the second control PDU corresponding to the receiving side is an MRW ACK/NACK STATUS PDU.

7. The method of claim 1, wherein the second control PDU corresponding to the receiving side is a RESET ACK PDU.

8. The method of claim 1, wherein the wireless communications system operates in an acknowledged mode (AM).

9. The method of claim 1, wherein the communications device is a mobile phone, a wireless mobile communications device, or a networking device.

10. The wireless communications device of claim 2, wherein the first control PDU corresponding to tile transmitting side is a RESET PDU.

11. The wireless communications device of claim 2, wherein the second control PDU corresponding to tile receiving side is an acknowledged/negatively acknowledged (ACK/NACK) STATUS PDU.

12. The wireless communications device of claim 2, wherein the second control PDU corresponding to the receiving side is a change window size STATUS PDU.

13. The wireless communications device of claim 2, wherein the second control PDU corresponding to the receiving side is an MRW ACK'NACK STATUS PDU.

14. The wireless communications device of claim 2, wherein the second control! PDU corresponding to the receiving side is a RESET ACK PDU.

15. The wireless communications device of claim 2, wherein the wireless communications system operates in an acknowledged mode (AM).

16. Tile wireless communications device of claim 2, wherein the communications device is a mobile phone, a wireless mobile communications device, or a networking device.

* * * * *